US011958973B2

United States Patent
Okamoto (10) Patent No.: US 11,958,973 B2
(45) Date of Patent: Apr. 16, 2024

(54) RESIN COMPOSITION, KIT, METHOD FOR MANUFACTURING RESIN COMPOSITION, METHOD FOR MANUFACTURING FORMED ARTICLE, AND FORMED ARTICLE

(71) Applicant: MITSUBISHI ENGINEERING-PLASTICS CORPORATION, Tokyo (JP)

(72) Inventor: Fumihito Okamoto, Hiratsuka (JP)

(73) Assignee: GLOBAL POLYACETAL CO., LTD., Tokyo (JP)

( * ) Notice: Subject to any disclaimer, the term of this patent is extended or adjusted under 35 U.S.C. 154(b) by 657 days.

(21) Appl. No.: 17/044,004

(22) PCT Filed: May 9, 2019

(86) PCT No.: PCT/JP2019/018512
§ 371 (c)(1),
(2) Date: Sep. 30, 2020

(87) PCT Pub. No.: WO2019/216368
PCT Pub. Date: Nov. 14, 2019

(65) Prior Publication Data
US 2021/0032468 A1     Feb. 4, 2021

(30) Foreign Application Priority Data

May 10, 2018   (JP) .................. 2018-091151
Dec. 27, 2018  (JP) .................. 2018-244713

(51) Int. Cl.
| | |
|---|---|
| C08L 77/06 | (2006.01) |
| B29C 45/00 | (2006.01) |
| B29C 65/16 | (2006.01) |
| C08K 3/38 | (2006.01) |
| C08K 5/00 | (2006.01) |
| C08K 5/5399 | (2006.01) |
| C08K 7/14 | (2006.01) |
| C08L 71/12 | (2006.01) |

(52) U.S. Cl.
CPC .......... *C08L 77/06* (2013.01); *B29C 45/0001* (2013.01); *B29C 65/16* (2013.01); *C08K 3/38* (2013.01); *C08K 5/0041* (2013.01); *C08K 5/0066* (2013.01); *C08K 5/5399* (2013.01); *C08K 7/14* (2013.01); *C08L 71/126* (2013.01); *C08K 2003/387* (2013.01); *C08L 2201/10* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 2010/0069539 A1 | 3/2010 | Morimoto et al. | |
| 2016/0355679 A1 | 12/2016 | Aepli | |
| 2019/0002692 A1 | 1/2019 | Okamoto | |
| 2020/0114586 A1* | 4/2020 | Kihara | B29C 65/1654 |

FOREIGN PATENT DOCUMENTS

| | | | |
|---|---|---|---|
| CN | 101595183 A | 12/2009 | |
| JP | 2007-98939 A | 4/2007 | |
| JP | 2008-308526 A | 12/2008 | |
| JP | 2015-25127 A | 2/2015 | |
| WO | WO 2015/091429 A1 | 6/2015 | |
| WO | WO 2017/110372 A1 | 6/2017 | |

OTHER PUBLICATIONS

Machine translation of JP 2015 025127 (Year: 2015).*
International Preliminary Report on Patentability, dated Nov. 10, 2020, and Written Opinion of the International Searching Authority, dated Jun. 25, 2019, for International Application No. PCT/JP2019/018512, with an English translation.
Office Action for corresponding Chinese Application No. 201980031224.X, dated Oct. 26, 2022, including an English translation.
Extended European Search Report for European Application No. 19799879.2, dated Dec. 15, 2021.
Korean Office Action (including an English translation thereof) issue in the corresponding Korean Patent Application No. 10-2020-7030076 on Jan. 23, 2024.

* cited by examiner

*Primary Examiner* — Robert T Butcher
(74) *Attorney, Agent, or Firm* — Birch, Stewart, Kolasch & Birch, LLP (57) ABSTRACT

To provide a resin composition having large light transmittance and capable of providing a molded article which is highly laser-weldable to an absorbing resin member, as well as a kit, a method for manufacturing the resin composition, a method for manufacturing a formed article, and a formed article. The resin composition contains a polyamide resin, a maleic anhydride-modified polyphenylene ether-based resin, a phosphazene-based flame retardant, a zinc metal oxide, and a light transmitting dye.

15 Claims, 1 Drawing Sheet

RESIN COMPOSITION, KIT, METHOD FOR MANUFACTURING RESIN COMPOSITION, METHOD FOR MANUFACTURING FORMED ARTICLE, AND FORMED ARTICLE

TECHNICAL FIELD

This invention relates to a resin composition, a kit, a method for manufacturing a resin composition, a method for manufacturing a faulted article, and a formed article; and particularly to a resin composition suitable for laser welding, as well as a kit using the resin composition, a method for manufacturing a formed article, and a formed article. The resin composition of this invention is mainly used for a resin composition (light transmitting resin composition) arranged on the side allowing light of laser welding to transmit therethrough.

BACKGROUND ART

Polyamide resin, a representative engineering plastic, is easy to process, excels in mechanical properties, electrical properties, heat resistance and other physical/chemical properties, and has therefore been widely used for vehicle components, electric/electronic equipment components, other precision equipment components and so forth. Polyamide resin in recent years has also been used increasingly for manufacturing components with intricate shapes, wherein joining of any components having a hollow part, such as intake manifold, has been accomplished by using various welding techniques, such as adhesive welding, vibration welding, ultrasonic welding, hot plate welding, injection welding and laser welding.

Welding with adhesive, however, suffers not only from time loss before curing, but also from risks of peripheral pollution and other environmental load. Ultrasonic welding and hot plate welding have reportedly damaged products due to vibration and heat, and have reportedly needed post-processes due to generation of wear debris or burr. Injection welding often needs specialized dies and molding machine, and is applicable only when the material is highly fluidic.

On the other hand, laser welding is a method by which a laser transmitting (also referred to as "non-absorbing", or "less-absorbing") resin member, and a resin member that absorbs laser light (occasionally referred to as "absorbing resin member", hereinafter) are brought into contact and welded, to thereby join both resin members. More specifically, this is a method by which laser light is irradiated from the side of the transmitting resin member, so as to melt the absorbing resin member that forms the joint face with energy of the laser light, to join the members. Since laser welding produces neither debris nor burr, causing less damage on the product. Also since polyamide resin per se is a material with a relatively high laser transmittance, so that process of polyamide resin with the aid of laser welding has been attracting attention in these days.

The transmitting resin member is typically obtainable by molding a light transmitting resin composition. As this sort of light transmitting resin composition, Patent Literature 1 discloses a polyamide resin composition used for laser welding, the polyamide resin composition including 100 parts by mass of (A) polyamide resin; and blended therewith 1 to 150 parts by mass of a reinforcing filler (B) having a refractive index at 23° C. of 1.560 to 1.600, at least one kind of monomer composing at least one kind of the (A) polyamide resin containing an aromatic ring. Patent Literature 1 discloses in its Examples a resin composition obtained by adding a glass fiber and a colorant, to a blend of polyamide MXD6 and polyamide 66, or to a blend of polyamide 6I/6T and polyamide 6.

CITATION LIST

Patent Literature

[Patent Literature 1] JP-A-2008-308526

SUMMARY OF THE INVENTION

Technical Problem

Now the molded article formed of a resin composition (transmitting member) is required to be highly laser-weldable to the absorbing resin member. The transmitting member is also required to be highly light transmissive, when intended to be used for laser welding.

It is therefore an object of this invention to solve the problems, and is to provide a resin composition having large light transmittance and capable of providing a molded article which is highly laser-weldable to an absorbing resin member, as well as a kit, a method for manufacturing the resin composition, a method for manufacturing a formed article, and a formed article.

Solution to Problem

The present inventors conducted diligent research to address the above-mentioned problems, and as a result, discovered that the above problems could be solved by using a maleic anhydride-modified polyphenylene ether-based resin, a phosphazene-based flame retardant, and a zinc metal oxide in a combined manner. Specifically, the problems described above are solved by the following means <1>, and preferably by the following means <2> to <13>.

<1> A resin composition comprising a polyamide resin, a maleic anhydride-modified polyphenylene ether-based resin, a phosphazene-based flame retardant, a zinc metal oxide, and a light transmitting dye.

<2> The resin composition of <1>, demonstrating a transmittance of 40% or larger, when formed into a 1-mm thick specimen and measured at a wavelength of 1070 nm in compliance with ISO 13468-2.

<3> The resin composition of <1> or <2>, wherein the polyamide resin contains a semi-aromatic polyamide resin.

<4> The resin composition of <1> or <2>, wherein the polyamide resin contains a polyamide resin contains a structural unit derive from a diamine and a structural unit derive from a dicarboxylic acid, 50 mol % or more of the structural unit derive from a diamine being derived from xylylenediamine, and 50 mol % or more of the structural unit derive from a dicarboxylic acid being derived from a straight-chain aliphatic α,ω-dicarboxylic acid having 4 to 20 carbon atoms.

<5> The resin composition of any one of <1> to <4>, wherein the zinc metal oxide contains zinc borate.

<6> The resin composition of any one of <1> to <5>, further comprising a glass fiber.

<7> A method for manufacturing a resin composition described in any one of <1> to <6>, the method comprising preparing a masterbatch of at least the phosphazene-based flame retardant in a maleic anhydride-modified polyphenylene ether-based resin, and then kneading the masterbatch with other ingredient.

<8> The method for manufacturing a resin composition of <7>, the method comprising preparing a masterbatch of a part of the zinc metal oxide together with the phosphazene-based flame retardant using a maleic anhydride-modified polyphenylene ether-based resin, then kneading the masterbatch with other ingredient, and, kneading the rest of the zinc metal oxide directly with the polyamide resin.

<9> A kit comprising a resin composition described in any one of <1> to <6>, and a light absorbing resin composition comprising a thermoplastic resin and a light absorbing dye.

<10> The kit of <9>, wherein the light absorbing resin composition comprising a polyamide resin, a maleic anhydride-modified polyphenylene ether-based resin, a phosphazene-based flame retardant, a zinc metal oxide, and a light absorbing dye.

<11> The kit of <10>, capable of yielding a welded article that demonstrates a tensile strength of 900 N or larger, when the resin composition and the light absorbing resin composition are individually formed into ASTM No. 4 dumbbell specimens of 1.5 mm thick, and welded using a Galvano mirror scanning-type fiber laser welder, under a press pressure of 600 N, a laser beam diameter of 2 mm, a laser welding width of 16 mm, and a total energy input for welding of 160 J.

<12> A method for manufacturing a formed article, the method comprising joining, by laser welding, a molded article obtained by molding a resin composition described in any one of <1> to <6>, and a molded article obtained by molding a light absorbing resin composition that contains a thermoplastic resin and a light absorbing dye.

<13> A formed article obtained by molding a resin composition described in any one of <1> to <6>, or obtained by forming the kit described in any one of <9> to <11>.

Advantageous Effects of Invention

This invention made it possible to provide a resin composition having large light transmittance and capable of providing a molded article which is highly laser-weldable to an absorbing resin member, as well as a kit, a method for manufacturing the resin composition, a method for manufacturing a formed article, and a formed article.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

The resin composition of this invention is featured by containing a polyamide resin, a maleic anhydride-modified polyphenylene ether-based resin, a phosphazene-based flame retardant, a zinc metal oxide, and a light transmitting dye. With such structure, obtainable is a resin composition which is highly laser-weldable to a light absorbing resin composition. The mechanism is presumably because the phosphazene-based flame retardant delays solidification of the resin to enhance the weld strength. In addition, the maleic anhydride-modified polyphenylene ether-based resin, having low fluidity, can presumably control flow of the resin, and can enhance the weld strength in cooperation with the phosphazene-based flame retardant. It is very surprising to find that the phosphazene-based flame retardant and the zinc metal oxide, having been respectively known as a flame retardant and a flame retardant auxiliary, can improve the laser weldability when blended. This invention can also advantageously reduce the total energy input by irradiation of light for laser welding.

Polyamide Resin

The resin composition of this invention contains a polyamide resin.

The polyamide resin used in this invention is not specifically limited regarding the types, and is exemplified by aliphatic polyamide resin and semi-aromatic polyamide resin.

The polyamide resin used in this invention preferably contains the semi-aromatic polyamide resin. Now, the semi-aromatic polyamide resin means that it contains a structural unit derive from a diamine and a structural unit derive from a dicarboxylic acid, in which aromatic group-containing structural unit accounts for 20 to 80 mol % of the total structural unit which is the sum of the structural unit derive from a diamine and the structural unit derive from a dicarboxylic acid. It is more preferable that the aromatic group-containing structural unit accounts for 40 to 60 mol % of the total structural unit which is the sum of the structural unit derive from a diamine and the structural unit derive from a dicarboxylic acid. With such semi-aromatic polyamide resin used therein, an obtainable molded article will have enhanced mechanical strength. The semi-aromatic polyamide resin is exemplified by terephthalate-based polyamide resin (polyamide 6T, polyamide 9T, polyamide 10T), and xylylenediamine-based polyamide resin described later.

Meanwhile, the aliphatic polyamide resin is exemplified by polyamide 6, polyamide 66, polyamide 11, and polyamide 12.

Regarding such polyamide resin used in this invention, descriptions in paragraphs [0011] to [0013] of JP-A-2011-132550 may be referred to, the contents of which are incorporated by reference into this patent specification.

At least one kind of polyamide resin used in this invention preferably contains a structural unit derive from a diamine and a structural unit derive from a dicarboxylic acid, wherein 50 mol % or more of the structural unit derive from a diamine is preferably derived from xylylenediamine, and 50 mol % or more of the structural unit derive from a dicarboxylic acid is preferably derived from a straight-chain aliphatic α,ω-dicarboxylic acid having 4 to 20 carbon atoms. In this patent specification, the polyamide resin may occasionally be referred to as xylylenediamine-based polyamide resin. Xylylenediamine is preferably metaxylylenediamine and/or paraxylylenediamine, preferably contains at least metaxylylenediamine, and more preferably such that 30 to 100 mol % of the structural unit derive from a diamine is assignable to metaxylylenediamine.

More preferably, 70 mol % or more of the structural unit derive from a diamine of the xylylenediamine-based polyamide resin is derived from xylylenediamine, the percentage is more preferably 75 mol % or more, even more preferably 80 mol % or more, yet more preferably 85 mol % or more, and furthermore preferably 90 mol % or more. Meanwhile more preferably, 70 mol % or more of the structural unit derive from a dicarboxylic acid of the xylylenediamine-based polyamide resin is derived from the straight-chain aliphatic α,ω-dicarboxylic acid having 4 to 20 carbon atoms, the percentage is more preferably 80 mol % or more, even more preferably 90 mol % or more, and yet more preferably 95 mol % or more.

Diamine that is employable as a starting diamine ingredient of the xylylenediamine-based polyamide resin, but other than metaxylylenediamine and paraxylylenediamine, is exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic ring-containing diamines such as bis(4-aminophenyl) ether, paraphenylenediamine, and bis(aminomethyl)naphthalene. Any one kind of them may be used, or two or more kinds of them may be used in a mixed manner.

The straight-chain aliphatic α,ω-dicarboxylic acid having 4 to 20 carbon atoms, suitably used as a starting dicarboxylic acid ingredient of the xylylenediamine-based polyamide resin, is exemplified by aliphatic dicarboxylic acids such as succinic acid, glutaric acid, pimelic acid, spheric acid, azelaic acid, adipic acid, sebacic acid, undecanedioic acid, and dodecanedioic acid. Any one kind of them may be used, or two or more kinds of them may be used in a mixed manner. Among them, adipic acid and sebacic acid are more preferred since the polyamide resin will have a melting point within a range suitable for molding.

Dicarboxylic acid ingredient, other than the straight-chain aliphatic α,ω-dicarboxylic acid having 4 to 20 carbon atoms, is exemplified by phthalic acid compound such as isophthalic acid, terephthalic acid, and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Any one kind of them may be used, or two or more kinds of them may be used in a combined manner.

A preferred embodiment of the xylylenediamine-based polyamide resin in this invention is exemplified by the one in which 50 mol % or more (preferably 70 mol % or more, and more preferably 90 mol % or more) of the structural unit derive from a diamine is derived from xylylenediamine, and 50 mol % or more (preferably 70 mol % or more, and more preferably 90 mol % or more) of the structural unit derive from a dicarboxylic acid is derived from adipic acid or sebacic acid.

Moreover, xylylenediamine in the embodiment is preferably metaxylylenediamine and/or paraxylylenediamine, more preferably contains at least metaxylylenediamine, and even more preferably such that 30 to 100 mol % of the structural unit derive from a diamine is assignable to metaxylylenediamine.

Now, the xylylenediamine-based polyamide resin, containing the structural unit derive from a diamine and the structural unit derive from a dicarboxylic acid as the major ingredient, does not absolutely exclude any other structural units, and may of course contain structural units derived from lactams such as ε-caprolactam and laurolactam; or from aliphatic aminocarboxylic acids such as aminocaproic acid and aminoundecanoic acid. Now the major ingredient means that the total number of the structural unit derive from a diamine and the structural unit derive from a dicarboxylic acid accounts for the largest percentage among all structural units composing the xylylenediamine-based polyamide resin. In this invention, the total number of the structural unit derive from a diamine and the structural unit derive from a dicarboxylic acid, in the xylylenediamine-based polyamide resin, preferably accounts for 90% or more of the total structural unit, which is more preferably 95% or more.

The polyamide resin preferably has a melting point of 150 to 350° C., which is more preferably 180 to 330° C., even more preferably 200 to 300° C., and yet more preferably 200 to 280° C.

The melting point may be measured by differential scanning calorimetry, in compliance with JIS K7121 and K7122.

The polyamide resin preferably has a number-average molecular weight (Mn) of 6,000 or larger at minimum, which is more preferably 8,000 or larger, even more preferably 10,000 or larger, yet more preferably 15,000 or larger, furthermore preferably 20,000 or larger, and again furthermore preferably 22,000 or larger. The upper limit of Mn is preferably 35,000 or below, more preferably 30,000 or below, even more preferably 28,000 or below, and yet more preferably 26,000 or below. Within these ranges, heat resistance, elastic modulus, dimensional stability, and moldability will be further improved.

The resin composition of this invention preferably contains 20 to 70% by mass of xylylenediamine-based polyamide resin relative to the resin composition. The percentage at which the xylylenediamine-based polyamide resin is contained in the resin composition is preferably 22% by mass or larger, more preferably 25% by mass or larger, and even more preferably 30% by mass or larger. Meanwhile, the percentage of content is preferably 65% by mass or smaller, and more preferably 60% by mass or smaller.

Only one kind of the xylylenediamine-based polyamide resin may be contained, or two or more kinds may be contained. When two or more kinds are contained, the total content preferably falls within the aforementioned ranges.

The resin composition of this invention preferably contains 20 to 70% by mass of polyamide resin relative to the resin composition. Percentage of the polyamide resin preferably accounts for 22% by mass or more of the resin composition, which is more preferably 25% by mass or more, and even more preferably 28% by mass or more. Meanwhile, the percentage is preferably 65% by mass or less, and more preferably 60% by mass or less.

Only one kind of the polyamide resin may be contained, or two or more kinds may be contained. When two or more kinds are contained, the total content preferably falls within the aforementioned ranges.

Maleic Anhydride-Modified Polyphenylene Ether-Based Resin

The maleic anhydride-modified polyphenylene ether-based resin is a polyphenylene ether-based resin modified with maleic anhydride. Content of maleic anhydride in the maleic anhydride-modified polyphenylene ether-based resin is 0.01 to 1.0% by mass on the maleic acid basis, which is preferably 0.1 to 0.7% by mass. Within these ranges, a high level of mechanical strength will be attainable.

Now, the content of maleic anhydride in the maleic anhydride-modified polyphenylene ether-based resin means the amount of maleic anhydride, used for modifying the polyphenylene ether-based resin, reacted with the polyphenylene ether-based resin, when calculated on the maleic acid basis.

The polyphenylene ether-based resin is exemplified by poly(2,6-dimethyl-1,4-phenylene ether), poly(2,6-diethyl-1,4-phenylene ether), poly(2,6-dipropyl-1,4-phenylene ether), poly(2-methyl-6-ethyl-1,4-phenylene ether), and poly(2-methyl-6-propyl-1,4-phenylene ether). Poly(2,6-dimethyl-1,4-phenylene ether) is particularly preferred.

Preferred polyphenylene ether-based resin typically demonstrates a specific viscosity of 0.2 to 0.6 dL/g when measured in chloroform at 30° C., which is more preferably 0.3 to 0.5 dL/g. With the specific viscosity smaller than 0.2 dL/g, impact resistance would occasionally degrade, meanwhile with the specific viscosity exceeding 0.6 dL/g, the moldability or appearance will tend to degrade. The specific viscosity is adjustable within the aforementioned ranges, by using two or more kinds of polyphenylene ether-based resins having different values of specific viscosity in a combined manner.

The content of the maleic anhydride-modified polyphenylene ether-based resin is preferably 1.0% by mass or more of the resin composition at lowest, and is more preferably 2.5% by mass or more. The upper limit value is preferably 20.0% by mass or below, more preferably 15.0% by mass or below, even more preferably 12.0% by mass or below, yet more preferably 9.0% by mass or below, furthermore preferably 7.0% by mass or below, and again furthermore preferably 5.5% by mass or below. With the content adjusted to 20.0% by mass or less, the laser weldability may further be enhanced even if the total energy input of laser welding were reduced.

The resin composition of this invention may contain only one kind of the maleic anhydride-modified polyphenylene ether-based resin, or may contain two or more kinds. When two or more kinds are contained, the total content preferably falls within the aforementioned ranges.

Other Resin Ingredient

The resin composition of this invention may contain other resin ingredient, other than the polyamide resin and the maleic anhydride-modified polyphenylene ether-based resin.

As such other resin ingredient, employable is polyester resin such as polyethylene terephthalate and polybutylene terephthalate; and thermoplastic resin such as polycarbonate resin and polyacetal resin.

The resin composition of this invention may alternatively have blended therein substantially no resin ingredient other than the polyamide resin and the maleic anhydride-modified polyphenylene ether-based, which means that the content is typically 5% by mass or less relative to the total content of the resin ingredients contained in the resin composition. The content may further be 1% by mass or less, and may particularly be 0.4% by mass or less.

That is, the resin composition of this invention is preferably such that the total of the polyamide resin and the maleic anhydride-modified polyphenylene ether-based resin preferably accounts for 95% by mass or more of the resin ingredients contained in the resin composition.

Phosphazene-Based Flame Retardant

The resin composition of this invention contains a phosphazene-based flame retardant. The phosphazene-based flame retardant, when blended, will expectedly improve flame retardance of the resin composition, will allow stronger coloration with an LTW dye as compared with brominated polystyrene-based flame retardant or the like, and will be highly compatible with the resin.

The phosphazene-based flame retardant used in this invention is an organic compound having —P═N— bond in the molecule thereof, and is preferably at least one species selected from the group consisting of cyclic phosphazene-based flame retardant represented by formula (1), chain-like phosphazene-based flame retardant represented by formula (2), and, crosslinked phosphazene-based flame retardant having the aforementioned phosphazene-based flame retardants crosslinked by a crosslinking group. The crosslinking group is preferably oxygen atom. The crosslinking group is preferably an oxygen atom that crosslinks $R^1$ and/or $R^2$ of the cyclic phosphazene-based flame retardant (molecule) represented by formula (1), with $R^1$ and/or $R^2$ of other molecule (cyclic phosphazene-based flame retardant represented by formula (1)).

[Chemical Formula 1]

(1)

In formula (1), "a" represents an integer of 3 to 25; and $R^1$ and $R^2$ may be same or different, and individually represents an alkyl group, cycloalkyl group, alkenyl group, alkynyl group, aryloxy group, amino group, hydroxy group, aryl group or alkylaryl group.

[Chemical Formula 2]

(2)

In formula (2), "b" represents an integer of 3 to 10000; and $R^3$ and $R^4$ may be same or different, and individually represents an alkyl group, cycloalkyl group, alkenyl group, alkynyl group, aryloxy group, amino group, hydroxy group, aryl group or alkylaryl group.

$R^5$ represents at least one group selected from —N═P(OR$^3$)$_3$ group, —N═P(OR$^4$)$_3$ group, —N═P(O)OR$^3$ group, and —N═P(O)OR$^4$ group; and $R^6$ represents at least one group selected from —P(OR$^3$)$_4$ group, —P(OR$^4$)$_4$ group, —P(O)(OR$^3$)$_2$ group, and —P(O)(OR$^4$)$_2$ group.

In formula (1) and formula (2), the alkyl group is exemplified by alkyl groups having 1 to 15 carbon atoms such as methyl group, ethyl group, propyl group, isopropyl group, butyl group, t-butyl group, pentyl group, hexyl group, octyl group, decyl group, and dodecyl group; which is more preferably alkyl groups having 1 to 6 carbon atoms such as methyl group, ethyl group, propyl group, isopropyl group, butyl group, t-butyl group, pentyl group, and hexyl group; and is particularly alkyl groups having 1 to 4 carbon atoms such as methyl group, ethyl group, and propyl group.

The cycloalkyl group is exemplified by cycloalkyl groups having 5 to 14 carbon atoms, such as cyclopentyl group and cyclohexyl group, and is preferably cycloalkyl group.

The alkenyl group is exemplified by alkenyl groups having 2 to 8 carbon atoms, such as vinyl group and allyl group. The cycloalkenyl group is exemplified by cycloalkenyl groups having 5 to 12 carbon atoms, such as cyclopentyl group and cyclohexyl group.

The alkynyl group is exemplified by alkynyl groups having 2 to 8 carbon atoms, such as ethynyl group and propynyl group; and also by alkynyl groups having aryl group as a substituent, such as ethynylbenzene group.

The aryl group is exemplified by aryl groups having 6 to 20 carbon atoms, such as phenyl group, methylphenyl (or, tolyl) group, dimethylphenyl (or, xylyl) group, trimethylphenyl group and naphthyl group. Among them, aryl groups having 6 to 10 carbon atoms are preferred, and phenyl group is particularly preferred.

The alkylaryl group is exemplified by aralkyl group having 6 to 20 carbon atoms, such as benzyl group, phenethyl group and phenylpropyl group. Among them, aralkyl groups having 7 to 10 carbon atoms are preferred, and benzyl group is particularly preferred.

Among them, preferred is a compound having aryl groups or arylalkyl groups for $R^1$ and $R^2$ in formula (1) and for $R^3$ and $R^4$ in un formula (2). With such aromatic phosphazene-based flame retardant used therein, the resin composition will have effectively enhanced heat resistance. From this point of view, each of $R^1$, $R^2$, $R^3$ and $R^4$ is preferably an aryl group, and particularly a phenyl group.

The phosphazene-based flame retardant represented by formula (1) or formula (2) is exemplified by phenoxyphosphazene; (poly)tolyloxyphosphazenes such as o-tolyloxyphosphazene, m-tolyloxyphosphazene, and p-tolyloxyphosphazene; (poly)xylyloxyphosphazenes such as o,m-xylyloxyphosphazene, o,p-xylyloxyphosphazene, and m,p-xylyloxyphosphazene; o,m,p-trimethylphenyloxyphosphazene; (poly) phenoxytolyloxyphosphazenes such as phenoxy o-tolyloxyphosphazene, phenoxy m-tolyloxyphosphazene, and phenoxy p-tolyloxyphosphazene; (poly) phenoxytolyloxyxylyloxyphosphazenes such as phenoxy o,m-xylyloxyphosphazene, phenoxy o,p-xylyloxyphosphazene, and phenoxy m,p-xylyloxyphosphazene; and phenoxy o,m, p-trimethylphenyloxyphosphazene.

As the cyclic phosphazene-based flame retardant represented by formula (1), particularly preferred is cyclic phenoxyphosphazene having a phenyl group for each of $R^1$ and $R^2$. Such cyclic phenoxyphosphazene-based flame retardant is exemplified by compounds including phenoxycyclotriphosphazene, octaphenoxycyclotetraphosphazene, and decaphenoxycyclopentaphosphazene, which are obtainable by allowing ammonium chloride and phosphorus pentachloride to react at 120 to 130° C. to obtain a mixture of cyclic and straight-chain chlorophosphazenes, isolating therefrom cyclic chlorophosphazenes including hexachlorocyclotriphosphazene, octachlorocyclotetraphosphazene, and decachlorocyclopentaphosphazene, followed by substitution with phenoxy groups. The cyclic phenoxyphosphazene-based flame retardant is preferably a compound with "a" in formula (1) represented by an integer of 3 to 8, and may even be a mixture of compounds having different numbers for "a".

The number "a" preferably has an average value of 3 to 5, which is more preferably 3 or 4. In particular, preferred is a mixture that contains 50% by mass or more of compound with a=3, 10 to 40% by mass of compound with a=4, and 30% by mass or less in total of compounds with a=5 or larger.

The chain-like phosphazene-based flame retardant represented by formula (2) is particularly preferably a chain-like phenoxyphosphazene-based flame retardant having a phenyl group for each of $R^3$ and $R^4$. Such chain-like phenoxyphosphazene-based flame retardant is exemplified by a compound obtainable typically by allowing the hexachlorocyclotriphosphazene obtained by the aforementioned method to cause ring-opening polymerization at 220 to 250° C. to thereby obtain straight-chain dichlorophosphazene having a degree of polymerization of 3 to 10000, followed by substitution with phenoxy groups. The straight-chain phenoxyphosphazene-based flame retardant preferably has a value of "b" in formula (2) of 3 to 1000, which is more preferably 3 to 100, and even more preferably 3 to 25.

The crosslinked phosphazene-based flame retardant is exemplified by compounds having a crosslinking structure of 4,4'-diphenylene group, such as compounds having a crosslinking structure of 4,4'-sulfonyldiphenylene (or, bisphenol S residue), compounds having a crosslinking structure of 2,2-(4,4'-diphenylene)isopropylidene group, compounds having a crosslinking structure of 4,4'-oxydiphenylene group, and compounds having a crosslinking structure of 4,4'-thiodiphenylene group.

As the crosslinked phosphazene-based flame retardant, preferred from the viewpoint of flame retarding property is a crosslinked phenoxyphosphazene-based flame retardant produced by crosslinking, with the aforementioned crosslinking group, the cyclic phenoxyphosphazene-based flame retardant having phenyl groups for $R^1$ and $R^2$ in formula (1); or a crosslinked phenoxyphosphazene-based flame retardant produced by crosslinking, with the aforementioned crosslinking group, the chain-like phenoxyphosphazene-based flame retardant having phenyl groups for $R^3$ and $R^4$ in formula (2). The phenoxyphosphazene-based flame retardant, produced by crosslinking the cyclic phenoxyphosphazene-based flame retardant with the aforementioned crosslinking group, is more preferred.

Content of the phosphazene-based flame retardant in the resin composition of this invention is preferably 1% by mass or more of the resin composition at lowest, which is more preferably 2% by mass or more. The upper limit is preferably 20% by mass or below, more preferably 15% by mass or below, even more preferably 14% by mass or below, yet more preferably 13% by mass or below, and furthermore preferably 12% by mass or below. With the content controlled to 11% by mass or less, the laser weldability may further be enhanced even under reduced total energy input for laser welding.

The resin composition of this invention may contain only one kind of the phosphazene-based flame retardant, or may contain two or more kinds. When two or more kinds are contained, the total content preferably falls within the aforementioned ranges.

The resin composition of this invention preferably contains substantially no flame retardant other than the phosphazene-based flame retardant. Now, the notation "contains substantially no . . . " means that the content of the flame retardant other than the phosphazene-based flame retardant is 10% by mass or less of the amount of blending of the phosphazene-based flame retardant, which is preferably 5% by mass or less, and more preferably 1% by mass or less.

Zinc Metal Oxide

The resin composition of this invention contains a zinc metal oxide. With the zinc metal oxide blended therein, the resin composition will expectedly have improved flame retardance, and will become unlikely to reduce the transmittance of the resin irrespective of the amount of addition thereof and phosphorus atom concentration of the polyamide resin. The zinc metal oxide is preferably zinc borate. Zinc borate is obtainable from zinc oxide and boric acid, and is exemplified by hydrates such as $ZnO·B_2O_3·2H_2O$ and $2ZnO·3B_2O_3·3.5H_2O$, and anhydrous salts.

Content of the zinc metal oxide in the resin composition of this invention is preferably 3% by mass or more of the resin composition at lowest, which is more preferably 4% by mass or more, and even more preferably 5% by mass or more. The upper limit value is preferably 16% by mass or below, more preferably 15% by mass or below, and even more preferably 14% by mass or below.

The resin composition of this invention may contain only one kind of zinc metal oxide, or may contain two or more kinds. When two or more kinds are contained, the total content preferably falls within the aforementioned ranges.

The resin composition of this invention preferably contains substantially no flame retardant auxiliary other than the zinc metal oxide. Now, the notation "contains substantially no . . . " means that the content of the flame retardant auxiliary other than zinc metal oxide is 10% by mass or less of the amount of blending of the zinc metal oxide, which is preferably 5% by mass or less, and more preferably 1% by mass or less.

Glass Fiber

The resin composition of this invention preferably contains glass fiber.

The glass fiber contains A-glass, C-glass, E-glass, S-glass or the like, among which E-glass (non-alkali glass) is particularly preferred. Also zero-boron glass, boron-free glass and so forth may be encompassed.

The glass fiber used for the resin composition of this invention may be a monofilament, or may be a multifilament obtained by twisting two or more monofilaments.

Form of the glass fiber may be any of "glass roving" which is a continuous roll of monofilament or multifilament, "chopped strand" having a cut length (number average fiber length) of 1 to 10 mm, and "milled fiber" with a milling length (number average fiber length) of 10 to 500 μm, and so forth. Such glass fibers are marketed under the product names of "Glasslon chopped strand" and "Glasslon milled fiber" from Asahi Fiber Glass Co., Ltd., which are readily available. Glass fibers with different forms may be used in a combined manner.

Also glass fibers with modified cross-sectional shapes may be preferred in this invention. The modified cross-sectional shape is preferably defined by flatness, which is ratio (D2/D1) of long diameter D2 and short diameter D1 of a fiber when viewed in a cross-section taken in the direction normal to the longitudinal direction, of typically 1.5 to 10, preferably 2.5 to 10, even more preferably 2.5 to 8, and particularly 2.5 to 5. Description on such flat glass in paragraphs [0065] to [0072] of JP-A-2011-195820 may be referred to, the contents of which are incorporated by reference into this patent specification.

The glass fiber in this invention may alternatively be glass bead. The glass bead has a spherical shape with an outer diameter of 10 to 100 μm, which is typically marketed and readily available under the product name of "EGB731" from Potters Ballotin Ltd. Meanwhile, the glass flake has a flaky shape with a thickness of 1 to 20 μm and a length of a side of 0.05 to 1 mm, which is typically marketed and readily available under the product name of "Fleka" from Nippon Sheet Glass Company, Ltd.

In particular, the glass fiber used in this invention preferably has a weight-average fiber diameter of 1 to 20 μm, and a cut length (number average fiber length) of 1 to 10 mm. Now, the weight-average fiber diameter of a glass fiber, when having a flattened cross-section, is determined by a weight-average fiber diameter of a circle having the same area.

The glass fiber used in this invention may be sized with a sizing agent. The sizing agent in this case is preferably a urethane-based sizing agent.

Content of the glass fiber in the resin composition of this invention is preferably 20% by mass or more in the resin composition, and more preferably 25% by mass or more. Meanwhile, content of the glass fiber in the resin composition of this invention is preferably 50% by mass or less in the resin composition, more preferably 45% by mass or less, even more preferably 40% by mass or less, and yet more preferably 35% by mass or less.

The resin composition of this invention may contain only one kind of the glass fiber, or two or more kinds. When two or more kinds are contained, the total content preferably falls within the aforementioned ranges.

Light Transmitting Dye

The light transmitting dye used in this invention is typically a black dye, which is specifically exemplified by nigrosin, naphthalocyanine, aniline black, phthalocyanine, porphyrin, perinone, quaterrylene, azo dye, anthraquinone, pyrazolone, squaric acid derivatives, and immonium dye.

Commercially available products are exemplified by e-BIND LTW-8731H, and e-BIND LTW-8701H which are colorants manufactured by Orient Chemical Industries, Ltd.; Plast Yellow 8000, Plast Red M 8315 and Oil Green 5602 which are colorants manufactured by Arimoto Chemical Co., Ltd.; and Macrolex Yellow 3G, Macrolex Red EG and Macrolex Green 3 which are colorants manufactured by LANXESS.

In particular, with the polyamide resin composition containing therein, as the light transmitting dye, at least one of pyrazolone, perinone and anthraquinone, an obtainable molded article will be effectively suppressed from causing color migration after wet heat test.

The light transmitting dye may be a mixture of chromatic colorants. An exemplary embodiment relates to mixing of red colorant, blue colorant and green colorant to simulate black colorant.

Content of the light transmitting dye in the resin composition of this invention is preferably 0.001% by mass or more per 100 parts by mass of the resin composition, more preferably 0.006% by mass or more, even more preferably 0.018% by mass or more, and may also be 0.024% by mass or more, 0.030% by mass or more, and 0.050% by mass or more. The upper limit value is preferably 5.0% by mass or below, more preferably 3.0% by mass or below, even more preferably 1.0% by mass or below, yet more preferably 0.20% by mass or below, and may also be 0.10% by mass or below, and 0.060% by mass or below.

Only one kind of the light transmitting dye may be contained, or two or more kinds may be contained. When two or more kinds are contained, the total content preferably falls within the aforementioned ranges.

The resin composition of this invention preferably contains substantially no carbon black. Now, the notation "contains substantially no . . . " means that the content is 0.0001% by mass or less of the resin composition.

Nucleating Agent

The resin composition of this invention may contain a nucleating agent, for the purpose of controlling crystallization speed. The nucleating agent may be of any kind without special limitation, which is preferably talc, boron nitride, mica, kaolin, calcium carbonate, barium sulfate, silicon nitride, potassium titanate or molybdenum disulfide, which is more preferably talc or boron nitride, and even more preferably talc.

Content of the nucleating agent, when contained in the resin composition of this invention, is preferably 0.01 to 10 parts by mass, per 100 parts by mass of a specific polyamide resin, which is more preferably 0.1 to 8 parts by mass, and even more preferably 0.1 to 6 parts by mass.

The resin composition of this invention may contain only one kind of the nucleating agent, or may contain two or more kinds. When two or more kinds are contained, the total content preferably falls within the aforementioned ranges.

Lubricant

The resin composition of this invention may contain a lubricant.

The lubricant is exemplified by aliphatic carboxylic acid, salt of aliphatic carboxylic acid, ester of aliphatic carboxylic acid and alcohol, aliphatic hydrocarbon compound having a number average molecular weight of 200 to 15,000, and polysiloxane-based silicone oil.

The aliphatic carboxylic acid is exemplified by saturated or unsaturated, aliphatic mono-, di- or tricarboxylic acids. Now, the aliphatic carboxylic acid encompasses alicyclic carboxylic acids. Among them, preferred aliphatic carboxylic acid is mono- or dicarboxylic acid having 6 to 36 carbon atoms, which is more preferably aliphatic saturated monocarboxylic acid having 6 to 36 carbon atoms. Specific examples of such aliphatic carboxylic acid include palmitic acid, stearic acid, caproic acid, capric acid, lauric acid, arachic acid, behenic acid, lignoceric acid, cerotic acid, melissic acid, tetratriacontanoic acid, montanic acid, adipic acid, and azelaic acid. The salt of aliphatic carboxylic acid is exemplified by sodium salt, potassium salt, calcium salt, and magnesium salt.

Aliphatic carboxylic acid, employable for forming the ester of aliphatic carboxylic acid and alcohol, may be same for example as the aforementioned aliphatic carboxylic acid. On the other hand, the alcohol is exemplified by saturated or unsaturated, monohydric or polyhydric alcohols. These alcohols may have substituent such as fluorine atom and aryl group. Among them, monohydric or polyhydric, saturated alcohol having 30 or less carbon atoms is preferred; and aliphatic or alicyclic, saturated monohydric alcohol or aliphatic saturated polyhydric alcohol, having 30 or less carbon atoms, are more preferred.

The alcohol is specifically exemplified by octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

The ester of aliphatic carboxylic acid and alcohol is specifically exemplified by beeswax (mixture containing myricyl palmitate as a major ingredient), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

The aliphatic hydrocarbon having a number average molecular weight of 200 to 15,000 is exemplified by liquid paraffin, paraffin wax, microcrystalline wax, polyethylene wax, Fischer-Tropsch wax, and α-olefin oligomer having 3 to 12 carbon atoms. Now, the aliphatic hydrocarbon encompasses alicyclic hydrocarbon. The aliphatic hydrocarbon preferably has a number average molecular weight of 5,000 or smaller.

Among them, paraffin wax, polyethylene wax and partial oxide of polyethylene wax are preferred; and paraffin wax and polyethylene wax are more preferred.

Content of the lubricant, when contained in the resin composition of this invention, is preferably 0.05 to 1 parts by mass, per 100 parts by mass of a specific polyamide resin, which is more preferably 0.1 to 0.8 parts by mass, and even more preferably 0.2 to 0.6 parts by mass.

The resin composition of this invention may contain only one kind of the lubricant, or two or more kinds. When two or more kinds are contained, the total content preferably falls within the aforementioned ranges.

Other Ingredient

The resin composition of this invention may contain other ingredient, without departing from the spirit of this invention. Such other ingredient is exemplified by filler other than glass fiber, light stabilizer, antioxidant, flame retardant other than phosphazene-based flame retardant, flame retardant auxiliary other than zinc metal oxide, UV absorber, fluorescent brightener, anti-dripping agent, antistatic agent, anti-clouding agent, anti-blocking agent, fluidity improver, plasticizer, dispersion aid, and antibacterial agent. Only one of these ingredients may be used, or two or more of them may be combined.

For the resin composition of this invention, contents of resin ingredient, the light transmitting dye, as well as the glass fiber and other additives are adjusted to total 100% by mass.

As a special embodiment of polyamide resin composition of this invention, exemplified is an embodiment that employs, as the polyamide resin, a polyamide resin in which 70 mol % or more of the structural unit derive from a dicarboxylic acid is derived from a straight-chain aliphatic α,ω-dicarboxylic acid having 9 to 20 carbon atoms (more preferably a polyamide resin additionally featured by that 70 mol % or more of the structural unit derive from a diamine is derived from metaxylylenediamine), and, employs at least one of pyrazolone, perinone and anthraquinone as the light transmitting dye. With such embodiment, an obtainable molded article will be more effectively suppressed from causing color migration after wet heat test, and will be able to retain large mechanical strength.

Properties of Resin Composition

The resin composition of this invention preferably demonstrates a transmittance of 40% or larger, when formed into a 1-mm thick specimen and measured at a wavelength of 1070 nm in compliance with ISO 13468-2, wherein the transmittance may further be 45% or larger, 50% or larger, and even may be 53% or larger. The upper limit of the light transmittance is not specifically limited, and is practical enough even at 60% or below.

Method for Manufacturing Resin Composition

A method for manufacturing the resin composition of this invention is preferably, but not specifically limited to, a method using as a kneader a single-screw or twin-screw extruder having equipment with a vent hole for devolatalization. The polyamide resin ingredient, the glass fiber and the other optional ingredients may be fed at a time into the kneader, or alternatively the other ingredient may be added sequentially to the polyamide resin ingredient. The glass fiber is preferably side-fed into the kneader so as to suppress crushing during kneading. Any two or more kinds of ingredients, selected from the ingredients, may be preliminarily mixed and kneaded.

In this invention, the resin composition of this invention is obtainable by preliminarily preparing a masterbatch of the light transmitting dye in the polyamide resin or the like, and then by kneading the masterbatch with other ingredients (polyamide resin, glass fiber, etc.).

In this invention, it is preferable to preliminarily prepare a masterbatch of at least the phosphazene-based flame retardant using a maleic anhydride-modified polyphenylene ether-based resin, and then to knead the masterbatch with other ingredients. In particular as for the zinc metal oxide, a part thereof is preferably used for preparing a masterbatch together with the phosphazene-based flame retardant using the maleic anhydride-modified polyphenylene ether-based resin, the masterbatch is then kneaded with other ingredients, and the residual part of the zinc metal oxide is directly kneaded with the polyamide resin. With such structure, the zinc metal oxide will more efficiently be dispersed, and the resin composition will be less likely to produce void during laser welding, and tends to improve the weldability.

The method for manufacturing the resin composition of this invention is not specifically limited, and may employ any of molding methods generally applied to thermoplastic resin, such as injection molding, hollow molding, extrusion molding and press molding. A particularly preferred molding method in this case is injection molding for its excellent fluidity. In the injection molding, resin temperature is preferably controlled to 250 to 350° C.

Kit

This invention also discloses a kit that contains the resin composition, and a light absorbing resin composition that contains a thermoplastic resin and a light absorbing dye. The kit is suitably used for manufacturing a formed article by laser welding.

That is, the resin composition contained in the kit serves as the light transmitting resin composition, and a molded article obtained by molding the light transmitting resin composition serves as a transmitting resin member that transmits laser light during laser welding. On the other hand, a molded article obtained by molding the light absorbing resin composition serves as the absorbing resin member that absorbs laser light during laser welding.

<<Light Absorbing Resin Composition>>

The light absorbing resin composition used in this invention contains the thermoplastic resin and the light absorbing dye.

The thermoplastic resin is exemplified by polyamide resin, olefinic resin, vinyl-based resin, styrene-based resin, acrylic resin, polyphenylene ether resin, polyester resin, polycarbonate resin and polyacetal resin. In particular, polyamide resin, polyester resin and polycarbonate resin are preferred from the viewpoint of compatibility with the resin composition, among which polyamide resin is further preferred. The thermoplastic resin may be of one kind, or two or more kinds.

The polyamide resin used for the light absorbing resin composition may be those of any kind, for which the aforementioned xylylenediamine-based polyamide resin is preferred.

The inorganic filler is exemplified by laser light-absorbing fillers such as glass fiber, carbon fiber, silica, alumina, talc, carbon black, and inorganic powder coated with a laser-absorbing material. Glass fiber is preferred. The glass fiber is synonymous to the glass fiber which may be blended into the aforementioned resin composition of this invention, and the same will also apply to the preferred ranges.

The light absorbing dye is any of those demonstrating a maximum absorption within the wavelength range of laser light to be irradiated, which is within the range from 800 nm to 1100 nm in this invention, and is exemplified by inorganic pigments [black pigment such as carbon black (for example, acetylene black, lamp black, thermal black, furnace black, channel black, Ketjenblack, etc.); red pigment such as red iron oxide; orange pigment such as molybdate orange; white pigment such as titanium oxide]; and organic pigments (yellow pigment, orange pigment, red pigment, blue pigment and green pigment). Among them, the inorganic pigments are preferred for their high concealability, and black pigment is further preferred. Two or more kinds of these light absorbing dyes may be used in a combined manner. Content of the light absorbing dye is preferably 0.01 to 30 parts by mass, per 100 parts by mass of the resin ingredient.

A first embodiment of the light absorbing resin composition of this invention relates to a composition in which the light absorbing resin composition contains the polyamide resin, the maleic anhydride-modified polyphenylene ether-based resin, the phosphazene-based flame retardant, the zinc metal oxide, and the light absorbing dye. The composition may further contain the glass fiber. Preferred ranges and other details of the polyamide resin, the maleic anhydride-modified polyphenylene ether-based resin, the phosphazene-based flame retardant, the zinc metal oxide, and the glass fiber in the light absorbing resin composition are same as those of the aforementioned resin composition of this invention.

The kit of this invention is preferably such that the ingredient of the resin composition excluding the light transmitting dye, and the ingredient of the light absorbing resin composition excluding the light absorbing dye have a commonality of ingredient of 80% by mass or more, which if more preferably 90% by mass or more, and even more preferably 95 to 100% by mass or more.

<<Laser Welding Method>>

Next, laser welding method will be explained. According to this invention, a formed article may be manufactured by joining, by laser welding, a molded article formed of the resin composition of this invention (transmitting resin member), and a molded article formed of the aforementioned light absorbing resin composition (absorbing resin member). Laser welding enables tight welding of the transmitting resin member and the absorbing resin member, without using an adhesive.

Shape of the members typically, but not restrictively, has at least a surface contactable part (flat face, curved face), for the convenience of joining of the members by laser welding. In laser welding, laser light transmitted through the transmitting resin member is absorbed by the absorbing resin member to fuse it, and thereby both members are welded. The molded article formed of the resin composition of this invention, having large laser transmittance, is suitably used as the transmitting resin member. Now, thickness of the member through which laser light passes (thickness of a part where the laser light passes, measured in the direction of laser transmission) may suitably be determined depending on application, chemical composition of the resin composition and so forth, which is typically 5 mm or thinner, and preferably 4 mm or thinner.

Laser light source used for laser welding may be determined depending on absorption wavelength of the light absorbing dye. Laser light within the wavelength range from 800 to 1100 nm is preferred, for which semiconductor laser or fiber laser are employable.

In this invention, the total energy input of laser irradiation may be reduced to 200 J or below, and may even to 180 J or below. This invention is highly beneficial since a high level of laser weldability is attainable, even under such low level of total energy input. The lower limit of the total energy input may be controlled to 5 J or above, yet may be 10 J or above, and may particularly be 50 J or above.

More specifically, in an exemplary case where the transmitting resin member and the absorbing resin member are welded, first, the parts to be welded of both members are brought into contact. In this case, the parts to be welded are preferably kept under surface contact, which may be given by flat surfaces, curved surfaces, or combination of flat surface and curved surface. Next, laser light is irradiated from the side of the transmitting resin member. The laser light in this process may be condensed on the interface between both members, by using an optional lens. The thus condensed beam transmits through the transmitting resin member, and absorbed by the absorbing resin member at around the surface thereof, to thereby heat and melt the member. The heat then transmits by thermal conduction to the transmitting resin member to melt it, and thereby a molten pool is formed at the interface of both members, which joins both members after cooled.

The formed article thus formed by welding the transmitting resin member and the absorbing resin member demonstrates large bonding strength. Now, the formed article in this invention conceptually encompasses not only finished articles or components, but also components composing a part of them.

The kit of this invention may be devised to yield a welded article that demonstrates a tensile strength of 900 N or larger, when the resin composition and the light absorbing resin composition are individually formed into ASTM No. 4 dumbbell specimens of 1.5 mm thick, and welded using a Galvano mirror scanning-type fiber laser welder, under a press pressure of 600 N, a laser beam diameter of 2 mm, a laser welding width of 16 mm, and a total energy input for welding of 160 J. A tensile strength of 1000 N or larger, particularly 1300 N or larger, and more particularly 1500 N is attainable. The upper limit is not specifically limited, and is practical enough even at 2000 N or smaller for example. The weld strength may be measured according to a method described later in EXAMPLES.

The formed article of this invention, obtained by laser welding, excels in mechanical strength, has large weld strength, causes less damages on resin due to laser light irradiation, and is therefore applicable to various applications including various storage containers, electric/electronic equipment component, office automation (OA) equipment component, home appliance component, machine mechanical component, vehicle mechanical component, and so forth. Particularly preferred applications include food containers, drug containers, oil and fat containers, vehicle hollow components (various tanks, intake manifold component, camera casing, etc.), vehicle electric components (various control units, ignition coil component, etc.), motor component, various sensor component, connector component, switch component, circuit breaker component, relay component, coil component, transformer component, and lamp component. The resin composition of this invention and the kit are particularly suitable for vehicle-borne camera module.

EXAMPLES

This invention will further be detailed referring to Examples. All materials, amounts of consumption, ratios, process details and procedures described in Examples below may suitably be modified, without departing from the spirit of this invention. Hence, the scope of this invention is by no means limited to specific Examples below.

Starting Materials

Polyamide Resin
   MP10: Poly(m,p-xylylene sebacamide), synthesized according to a method described below.
   MXD6: Poly(m-xylylene adipamide), from Mitsubishi Gas Chemical Company, Inc.
   MP6: Poly(m,p-xylylene adipamide), synthesized according to a method described below.
   PA66: polyamide 66, Stabamid 26AE1K, from Solvay Exemplary Synthesis of MP6

Adipic acid was melted under heating in a reaction can with a nitrogen atmosphere, the content was kept stirred, into which mixed diamine having a mole ratio of paraxylylenediamine (Mitsubishi Gas Chemical Company, Inc.) and metaxylylenediamine (Mitsubishi Gas Chemical Company, Inc.) of 3:7 was gradually added dropwise under an increased pressure (0.35 MPa), so as to adjust the mole ratio of the diamines and adipic acid (from Rhodia) to approximately 1:1, during which the temperature was elevated up to 270° C. After completion of the dropwise addition, the pressure was lowered to 0.06 MPa, the reaction was allowed to continue for 10 minutes, to thereby control the content of ingredients having a molecular weight of 1,000 or smaller. The content was then taken out in the form of strands, pelletized using a pelletizer, to obtain a polyamide resin.

Exemplary Synthesis of MP10

Sebacic acid was melted under heating in a reaction can with a nitrogen atmosphere, the content was kept stirred, into which mixed diamine having a mole ratio of paraxylylenediamine (Mitsubishi Gas Chemical Company, Inc.) and metaxylylenediamine (Mitsubishi Gas Chemical Company, Inc.) of 3:7 was gradually added dropwise under an increased pressure (0.35 MPa), so as to adjust the mole ratio of the diamines and sebacic acid to approximately 1:1, during which the temperature was elevated up to 240° C. over two hours. After completion of the dropwise addition, the inner temperature was elevated, and upon arrival at 250° C., the inner pressure was reduced to 0.08 MPa, the inner temperature was further elevated, the melt polycondensation reaction was allowed to continue at 255° C. for 20 minutes, to thereby control the content of ingredients having a molecular weight of 1,000 or smaller. After completion of the reaction, the system was pressurized with nitrogen gas, the content was then taken out in the form of strands, pelletized using a pelletizer, to obtain a polyamide resin. Phosphorus atom concentration was found to be 250 ppm by mass.

Maleic Anhydride-Modified Polyphenylene Ether-Based Resin, Phosphazene-Based Flame Retardant, Zinc Metal Oxide PME-91FR: from Mitsubishi Engineering-Plastics Corporation Composed of 34.72% by mass of polyphenylene ether-based resin, 35.0% by mass of phosphazene-based flame retardant, 30.0% by mass of zinc borate, and 0.28% by mass of maleic anhydride.

Exemplary Manufacture of PME-91FR

All of the individual ingredients, prepared according to the aforementioned compositional ratio, were fed at a time into a Henschel mixer (bladed forced mixer), and stirred for two minutes to obtain a blend. The blend was fed into an extruder (TEM26SS, from Toshiba Machine Co., Ltd.) from the base of screw, using a dual screw type cassette weighing feeder (CE-W-1-MP, from Kubota Corporation), and then melt-kneaded. Temperature of the extruder was preset to 265° C. Strands ejected from an outlet of a die were pelletized using a pelletizer, to thereby obtain a masterbatch of the flame retardant.

Zinc Metal Oxide

Firebrake ZB: zinc borate, from Hayakawa & Co., Ltd.

Brominated Polystyrene

SAYTEX HP-3010: from Albemarle Japan Corporation

Antimony Trioxide

SICABATCH 404003: Masterbatch of antimony trioxide in polyamide 66 (70% by mass of antimony oxide), from SICA Nucleating Agent 5000A, from Hayashi Kasei Co., Ltd, Micron White #5000A, talc 5000S, from Hayashi Kasei Co., Ltd, Micron White #5000S, talc Lubricant WH255: ethylene bis(stearoamide)-based lubricant, Light Amide WH255, from Kyoeisha Chemical Co., Ltd.

CS-CP: calcium montanate, from Nitto Chemical Industry Co., Ltd.

Glass Fiber

T-296GH: from Nippon Electric Glass Co., Ltd.

Light Transmitting Dye

LTW-8701H: e-BIND LTW-8701H, from Orient Chemical Industries, Ltd., masterbatch of light transmitting dye in polyamide 66

Light Absorbing Dye

CB1: masterbatch of carbon black (MA600B, from Mitsubishi Chemical Corporation), MP6 used as a resin for preparing the masterbatch, with a content of carbon black in the masterbatch of 30% by mass.

CB2: masterbatch of carbon black (MA600B, from Mitsubishi Chemical Corporation), MP10 used as a resin for preparing the masterbatch, with a content of carbon black in the masterbatch of 30% by mass.

Example 1

<Compound>

Pellets for molding the light transmitting member (resin composition), and pellets for molding the light absorbing member (light absorbing resin composition), listed in Table 1 described later, were manufactured.

More specifically, the ingredients listed in Table 1 described later, but excluding the glass fiber, were individually weighed according to a compositional ratio given in Table 1 (in % by mass), dry-blended, and the blend was then fed from the base of screw of the twin screw extruder (TEM26SS, from Toshiba Machine Co., Ltd.) using a twin screw type cassette weighing feeder (CE-W-1-MP, from Kubota Corporation). The glass fiber was side-fed to the twin screw extruder using a vibrating cassette weighing feeder (CE-V-1B-MP, from Kubota Corporation), kneaded with the resin ingredient and so forth, to obtain the pellets for forming the light transmitting member (resin composition) and the pellets for forming light absorbing member (light absorbing resin composition). Temperature of the extruder was preset to 280° C.

The thus obtained pellets for forming the light transmitting member and the pellets for forming the light absorbing member were individually dried at 120° C. for four hours, and used for respectively manufacturing a light transmitting member test specimen (1.0 mm thick) and a light absorbing member test specimen (1.0 mm thick), using an injection molding machine (SE-50D, from Sumitomo Heavy Industries, Ltd.). For the molding, cylinder temperature was preset to 280° C.; meanwhile die surface temperature was preset to 110° C. for Example 1 and Comparative Example 1, and to 130° C. for Examples 2, 3 and Comparative Examples 2, 3.

<Light Transmittance>

The thus-obtained light transmitting member test specimen was subjected to measurement of light transmittance (in %) at 1070 nm, in compliance with ISO 13468-2.

<Weld Strength (N) of ASTM No. 4 Dumbbell Specimens (N)>

The above-obtained light transmitting member test specimen and the light absorbing member test specimen were welded using a Galvano mirror scanner, and weld strength of the welded specimens was measured.

Figure 1:
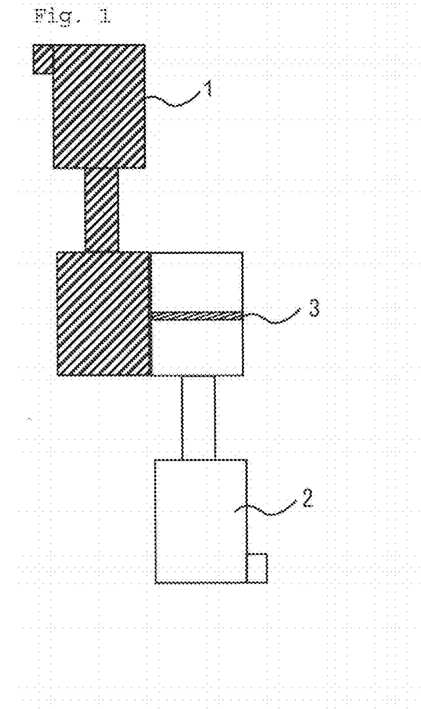
FIG. 1 A schematic drawing illustrating ASTM No. 4 dumbbell specimens welded to each other.

More specifically, the test specimens were stacked and welded as illustrated in FIG. 1. In FIG. 1, reference sign 1 represents the transmitting resin member test specimen, 2 represents the absorbing resin member test specimen, and 3 represents a laser irradiation area. Again in FIG. 1, projections at the left top end of the transmitting resin member 1 and at the right bottom end of the absorbing resin member 2 indicate the gate sides.

Laser irradiation was carried out with fiber laser (1070 nm) using an ordinary Galvano mirror scanner (marketed by Fine Device Co., Ltd., laser beam diameter=2 mm), at a laser output of 30 W to 200 W and a scanning speed of 70 to 2000 mm/sec, so as to adjust a width of welding by laser (width of the area 3 in FIG. 1) to 16 mm. The light transmitting member test specimen and the light absorbing member test specimen were pressed under a pressure of 0.5 MPa (600 N).

The welded test specimens were subjected to measurement of laser weld strength. The weld strength was measured using a tensile tester ("Model 5544" from Instron) (load cell±2 kN), with which the light transmitting member test specimen and the light absorbing member test specimen, integrated by welding, were clamped at both ends in the longitudinal direction thereof, and pulled at a tensile speed of 5 ram/min.

In Table 1, "(base fractured)" means that the strength was measured upon fracture of dumbbell specimen per se in a part other than the weld face, rather than that the peel strength was measured upon separation of the dumbbell specimens.

<Total Energy Input>

Relations between the weld strength of the above-obtained light transmitting member test specimen and the light absorbing member test specimen, and the total energy input for welding were examined. More specifically, the total energy input was calculated using the equations below.

Energy density (J/mm)=Laser output (W)×Scanning speed (mm/sec)

Total energy input (J)=Energy density (J/mm)×Number of times of scanning (times)×Scanning width (16 mm)

Values of the total energy input, obtained under varied number of times of scanning, were plotted in FIG. 1.

Examples 2 and 3, and Comparative Examples 1, 2 and 3

The processes were conducted in the same way as in Example 1, except for that the ingredients were changed as summarized in Table 1. Note that the total energy input could not be measured for Comparative Examples 1 to 3, since welding was not successful.

TABLE 1

|  |  | Example 1 | | Example 2 | | Example 3 | |
| --- | --- | --- | --- | --- | --- | --- | --- |
|  |  | Light transmitting member | Light absorbing member | Light transmitting member | Light absorbing member | Light transmitting member | Light absorbing member |
| Polyamide resin | MP10 | 33.3 | 33.3 | | | | |
|  | MXD6 | | | 46.9 | 48.5 | | |
|  | MP6 | | | | | 52.4 | 54 |
|  | PA66 | | | 5.5 | 5.5 | | |
| Maleic anhydride-modified polyphenylene ether-based resin, phosphazene-based flame retardant, zinc metal oxide | PME-91FR | 29 | 29 | 10 | 10 | 10 | 10 |
| Zinc metal oxide | Firebrake ZB | 4 | 4 | 4 | 4 | 4 | 4 |
| Brominated polystyrene | HP-3010 | | | | | | |
| Antimony trioxide | SICABATCH 404003 | | | | | | |
| Nucleating agent | 5000A | | | 1.2 | 1.2 | 1.2 | 1.2 |
| Necleating agent | 5000S | 1.5 | 1.5 | | | | |
| Lubricant | WH255 Light Amide | | | 0.4 | 0.4 | 0.4 | 0.4 |
| Lubricant | CS38CP, calcium montanate | 0.2 | 0.2 | | | | |
| Glass fiber | T-296GH | 30 | 30 | 30 | 30 | 30 | 30 |
| Light transmitting dye | LTW-8701H | 2 | | 2 | | 2 | |
| Light absorbing dye | CB1 | | | | 0.4 | | 0.4 |
| Light absorbing dye | CB2 | | 2 | | | | |
| Evaluation | Light transmittance (%) | 55 | — | 55 | — | 49 | — |
|  | Weld strength of ASTM No. 4 dumbbell specimens (N) | 941 (base fractured) | | 1653 (base fractured) | | 1544 (base fractured) | |

|  |  | Comparative Example 1 | | Comparative Example 2 | | Comparative Example 3 | |
| --- | --- | --- | --- | --- | --- | --- | --- |
|  |  | Light transmitting member | Light absorbing member | Light transmitting member | Light absorbing member | Light transmitting member | Light absorbing member |
| Polyamide resin | MP10 | 46.4 | 46.4 | | | | |
|  | MXD6 | | | 50.4 | 52 | | |
|  | MP6 | | | | | 54.6 | 56.2 |
|  | PA66 | | | 4 | 4 | | |
| Maleic anhydride-modified polyphenylene ether-based resin, phosphazene-based flame retardant, zinc metal oxide | PME-91FR | | | | | | |
| Zinc metal oxide | Firebrake 7B | | | | | | |
| Brominated polystyrene | HP-3010 | 12 | 12 | 7 | 7 | 7 | 7 |
| Antimony trioxide | SICABATCH 404003 | 8 | 8 | 5 | 5 | 5 | 5 |
| Nucleating agent | 5000A | 1.2 | 1.2 | 1.2 | 1.2 | 1.2 | 1.2 |
| Necleating agent | 5000S | | | | | | |
| Lubricant | WH255 Light Amide | 0.4 | 0.4 | 0.4 | 0.4 | 0.2 | 0.2 |
| Lubricant | CS38CP, calcium montanate | | | | | | |
| Glass fiber | T-296GH | 30 | 30 | 30 | 30 | 30 | 30 |
| Light transmitting dye | LTW-8701H | 2 | | 2 | | 2 | |
| Light absorbing dye | CB1 | | | | 0.4 | | 0.4 |
| Light absorbing dye | CB2 | | 2 | | | | |
| Evaluation | Light transmittance (%) | 2 | — | 5 | — | 5 | — |
|  | Weld strength of ASTM No. 4 dumbbell specimens (N) | Not welded | | Not welded | | Not welded | |

Figure 2:
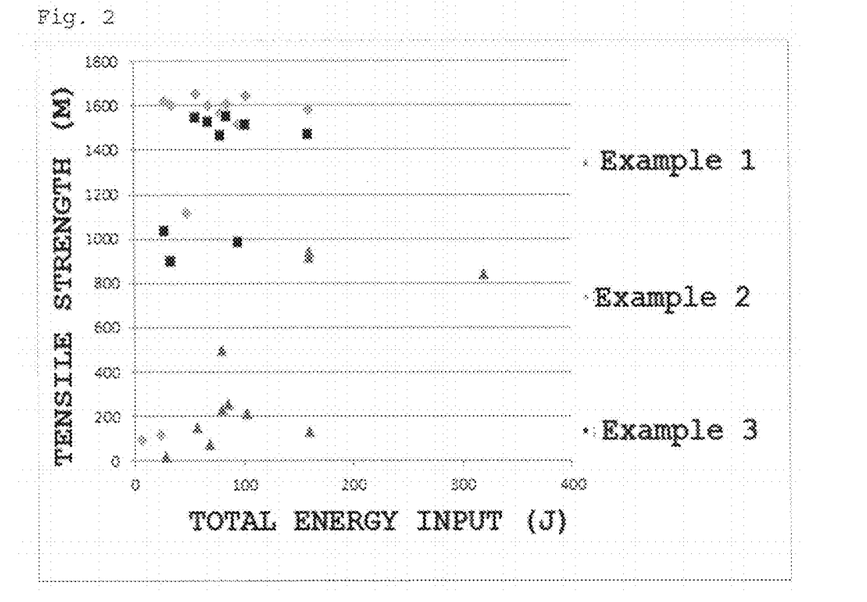
FIG. 2 A drawing illustrating relations between total energy input and states of welding between transmitting resin members and absorbing resin members when welded using a Galvano mirror scanning-type fiber laser welder.

As clearly taught by the results above, the resin compositions of this invention were found to demonstrate large light transmittance and good laser weldability (Examples 1 to 3). As illustrated in FIG. 2, the resin compositions of this invention were also found to attain high laser weldability, even under low total input energy of laser irradiation.

In contrast, use of other flame retardant and flame retardant auxiliary were found to demonstrate only low levels of light transmittance, and the specimens could not be laser-welded (Comparative Example 1 to 3).

REFERENCE SIGNS LIST

1 transmitting resin member test specimen
2 absorbing resin member test specimen
3 laser irradiation area

The invention claimed is:

1. A resin composition comprising a polyamide resin, a maleic anhydride-modified polyphenylene ether-based resin, a phosphazene-based flame retardant, a zinc metal oxide, and a light transmitting dye,
   wherein a content of the zinc metal oxide in the resin composition is 7% by mass or more and 16% by mass or below, and
   Wherein the resin composition demonstrates a transmittance of 40% or larger, when formed into a 1-mm thick specimen and measured at a wavelength of 1070 nm in compliance with ISO 13468-2.

2. The resin composition of claim 1, wherein the polyamide resin contains a semi-aromatic polyamide resin.

3. The resin composition of claim 1, wherein the polyamide resin contains a polyamide resin contains a structural unit derive from a diamine and a structural unit derive from a dicarboxylic acid, 50 mol % or more of the structural unit derive from a diamine being derived from xylylenediamine, and 50 mol % or more of the structural unit derive from a dicarboxylic acid being derived from a straight-chain aliphatic α,ω-dicarboxylic acid having 4 to 20 carbon atoms.

4. The resin composition of claim 1, wherein the zinc metal oxide contains zinc borate.

5. The resin composition of claim 1, further comprising a glass fiber.

6. The resin composition of claim 3, wherein the zinc metal oxide contains zinc borate.

7. The resin composition of claim 3, further comprising a glass fiber.

8. A method for manufacturing a resin composition described in claim 1, the method comprising preparing a masterbatch of at least the phosphazene-based flame retardant in a maleic anhydride-modified polyphenylene ether-based resin, and then kneading the masterbatch with other ingredient.

9. The method for manufacturing a resin composition of claim 8, the method comprising preparing a masterbatch of a part of the zinc metal oxide together with the phosphazene-based flame retardant using a maleic anhydride-modified polyphenylene ether-based resin, then kneading the masterbatch with other ingredient, and, kneading the rest of the zinc metal oxide directly with the polyamide resin.

10. A kit comprising a resin composition described in claim 1, and a light absorbing resin composition comprising a thermoplastic resin and a light absorbing dye.

11. The kit of claim 10, wherein the light absorbing resin composition comprising a polyamide resin, a maleic anhydride-modified polyphenylene ether-based resin, a phosphazene-based flame retardant, a zinc metal oxide, and a light absorbing dye.

12. The kit of claim 10, capable of yielding a welded article that demonstrates a tensile strength of 900 N or larger, when the resin composition and the light absorbing resin composition are individually formed into ASTM No. 4 dumbbell specimens of 1.5mm thick, and welded using a Galvano mirror scanning-type fiber laser welder, under a press pressure of 600 N, a laser beam diameter of 2 mm, a laser welding width of 16 mm, and a total energy input for welding of 160 J.

13. A method for manufacturing a formed article, the method comprising joining, by laser welding, a molded article obtained by molding a resin composition described in claim 1, and a molded article obtained by molding a light absorbing resin composition that contains a thermoplastic resin and a light absorbing dye.

14. A formed article obtained by molding a resin composition described in claim 1.

15. A formed article obtained by forming the kit described in claim 10.

* * * * *